United States Patent [19]

Chipman et al.

[11] 4,014,858

[45] Mar. 29, 1977

[54] POLYBUTYLENE TEREPHTHALATE

[75] Inventors: Gary R. Chipman, Naperville; Michael G. Henk, Wheaton; Jacob A. De Boer, Western Springs; Eli W. Blaha, Wheaton, all of Ill.

[73] Assignee: Standard Oil Company, Chicago, Ill.

[22] Filed: May 12, 1975

[21] Appl. No.: 576,478

[52] U.S. Cl. .......................... 260/75 R; 260/75 M
[51] Int. Cl.$^2$ ...................................... C08G 63/14
[58] Field of Search ................... 260/75 M, 75 R

[56] References Cited

UNITED STATES PATENTS

| | | | |
|---|---|---|---|
| 3,345,339 | 10/1967 | Parker et al. | 260/75 M |
| 3,846,459 | 11/1974 | Stapfer | 260/75 R |
| 3,936,421 | 2/1976 | Hayashi et al. | 260/75 |

FOREIGN PATENTS OR APPLICATIONS

| | | |
|---|---|---|
| 1,768,058 | 12/1971 | Germany |
| 2,407,155 | 8/1974 | Germany |
| 1,044,015 | 9/1966 | United Kingdom |

*Primary Examiner*—Donald E. Czaja
*Assistant Examiner*—S. M. Person
*Attorney, Agent, or Firm*—William H. Magidson; Arthur G. Gilkes; William T. McClain

[57] ABSTRACT

Reaction of terephthalic acid and butane diol using a tetravalent tin catalyst having the organo-to-tin linkage.

20 Claims, No Drawings

POLYBUTYLENE TEREPHTHALATE

This invention relates to the production of polybutylene terephthalate by reacting terephthalic acid and 1,4-butylene glycol in the presence of tetravalent tin catalyst having one organo-to-tin linkage.

The patent literature is replete with descriptions of preparing polyalkylene terephthalates by reacting an alkylene glycol with dialkyl terephthalates and/or terephthalic acid. If dialkyl terephthalates are used, the first stage of the process is an ester interchange reaction where substantially all of the monohydric alcohol liberated in the reaction is removed. If terephthalic acid is used, the first stage of the process is a polyesterification reaction. The first stages of these processes are considered complete when substantially all of the monohydric alcohol has been removed from the ester interchange reaction or when, in the case of the use of terephthalic acid, the cloudy reaction medium clears. All of these processes utilize excess dihydric alcohol. After the first stage of the process is completed, the condensation and polymerization to a high molecular weight polyester is substantially the same.

Terephthalic acid is generally preferred for the production of polyethylene terephthalate since terephthalic acid is less expensive on a molar basis than the dialkyl terephthalates and first stage polyesterification is faster than first stage ester interchange. Although there are numerous patents that describe the reaction of terephthalic acid and 1,4-butane diol, to the best of our knowledge all commercial polybutylene terephthalate is produced by the reaction of dimethyl terephthalate with 1,4-butane diol. Unfortunately, terephthalic acid acts as a catalyst for the conversion of 1,4-butane diol to tetrahydrofuran. Other things being equal, if more than about 0.20 moles of 1,4-butane diol per mole of terephthalic acid charged to the reactor is lost or converted to tetrahydrofuran in the first stage esterification, the theoretical direct economic advantage implicit in the use of terephthalic acid is lost and dimethyl terephthalate is economically more attractive than terephthalic acid.

As indicated above, numerous patents describe the reaction of 1,4-butane diol with terephthalic acid to produce polybutylene terephthalate. General Electric's German Offenlegungschrift No. 2,407,155 discusses these problems and the fact that Netherlands Patent No. 7,105,777 (1971) employs a 317% excess of 1,4-butane diol over the theoretical amount required (i.e. 3.17 moles of butane diol per mole terephthalic acid). Presumably the excess glycol is lost. The General Electric specification indicates that certain titanate, organo-tin (dibutyl tin-maleate or -dilaurate) or antimony oxide catalysts can be utilized to reduce the loss of 1,4-butane diol and the conversion of 1,4-butane diol to tetrahydrofuran. Examples 3 to 5 of this reference indicate a loss of 0.264 to 0.371 moles butane diol per each mole terephthalic acid charged to the reactor. Although the process described in this reference is an improvement over the prior art, the process is not sufficiently efficient in its utilization of butane diol to permit commercialization of a process based on terephthalic acid. Further, the reaction time for polyesterification is impractically slow using these catalysts.

Our studies have shown that other things being equal:
a. the higher the mol ratio of 1,4-butane diol to terephthalic acid, the less time it takes to complete the first stage of polyesterification;
b. the faster the first stage polyesterification the smaller the loss of butane diol.

Accordingly, increasing the mole ratio of 1,4-butane diol to terephthalic acid decreases the reaction time and the undesirable formation of tetrahydrofuran. However, the higher the mole ratio of 1,4-butane diol to terephthalic acid, the larger the reactor required to produce an equivalent amount of polybutylene terephthalate and the larger the butane diol recycle system. Accordingly, it is necessary to provide a method of producing polybutylene terephthalate from terephthalic acid and 1,4-butane diol using a relatively low molar ratio of 1,4-butane diol to terephthalic acid, with no more than 0.20 moles of 1,4-butane diol converted to tetrahydrofuran per mole of terephthalic acid used. If these criteria are not satisfied, there is no direct economic advantage in producing polybutylene terephthalate from terephthalic acid rather than dimethyl terephthalate.

The general object of this invention is to provide a commercially practicable method for producing polybutyleneterephthalate by the reaction of terephthalic acid with 1,4-butane diol. Other objects appear hereinafter.

We have now found that the objects of this invention can be attained by reacting in the presence of an organotin catalyst having one organo to each tin linkage (1) a polycarboxylic acid compound (acid, anhydride and/or methyl ester) comprising terephthalic acid in a concentration of at least 50 equivalent percent of the carboxyl equivalents and (2) a polyhydric alcohol component comprising from 75 to 100 equivalent percent 1,4-butane diol and said polyhydric alcohol is present in a concentration of from 1.1 to 4 hydroxyl equivalents per carboxyl equivalent. The catalysts useful in this invention appear to be significantly more active than the typical organo-tin, titanate or antimony oxide catalysts of commerce and permit a rapid first stage polyesterification of terephthalic acid with butylene glycol to form a clear polyester melt. Our studies have shown that the organotin catalysts of this invention permit a rapid homopolyesterification of low ratios of butane diol to terephthalic acid with economically practical levels of butane diol loss. Further, the catalysts are also effective in the condensation stage for increasing the polymer molecular weight to high I.V.s (inherent viscosity).

The catalysts useful in this invention are tetravalent tin catalysts having one organo to each tin linkage such as the hydrocarbyl stannoic anhydrides having the structure

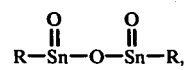

wherein each R contains 1 to 24 carbon atoms and can be alkyl, aralkyl, alkaryl or aryl; hydrocarbyl stannoic acids having the structure

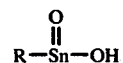

wherein R contains from 1 to 24 carbon atoms and can be alkyl, aralkyl, alkaryl or aryl; hydrocarbyl tin halides having the structure

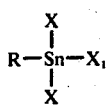

wherein R contains from 1 to 24 carbon atoms and can be alkyl, aralkyl, alkaryl or aryl and X is a halogen group such as chlorine or bromine and $X_1$ and $X_2$ are halogen such as chlorine or bromine or hydroxy groups, etc. Suitable catalysts include methyl stannoic anhydride, ethyl stannoic anhydride, isopropyl stannoic anhydride, butyl stannoic anhydride, octyl stannoic anhydride, butyl, octyl stannoic anhydride, stearyl stannoic anhydride, tetracosyl stannoic anhydride, phenyl stannoic anhydride, benzyl stannoic anhydride, p-octylphenyl stannoic anhydride, methyl stannoic acid, ethyl stannoic acid, tetracosyl stannoic acid, isopropyl stannoic acid, octyl stannoic acid, stearyl stannoic acid, phenyl stannoic acid, benzyl stannoic acid, p-octylphenyl stannoic acid, methyl tin trichloride, butyl tin dihydroxide monochloride, stearyl tin dihydroxide monochloride, etc. Of these, best results have been obtained with the commercially available butyl stannoic anhydride. If desired, these catalysts can be readily synthesized from hydrocarbyl tin trihalides. For example, if one mole of a hydrocarbyl tin trihalide is reacted with (a) two moles sodium hydroxide, a dihydroxy hydrocarbyl tin monohalide is formed or (b) three moles sodium hydroxide, a hydrocarbyl stannoic acid is formed. These organotin catalysts can be used in a concentration of about 0.01 to 1.00 parts by weight per each 100 parts by weight of the theoretical molecular weight of the final condensation polyester.

When 1,4-butane diol and terephthalic acid comprise substantially all of the ester-forming reactants, the mole ratio of 1,4-butane diol to terephthalic acid varies advantageously from 1.1 to 2 moles diol:1 mole terephthalic acid, preferably 1.1 to 1.75:1. Other things being equal, the higher the mole ratio, the larger the reactor required while the lower the mole ratio, the longer it takes to complete the first stage esterification (clear the reaction). Further, the higher the mole ratio, the higher the concentration of catalyst that should be used to minimize tetrahydrofuran conversion. At a 2:1 mole ratio there is approximately 0.2 mole of butane diol converted to tetrahydrofuran per mole of terephthalic acid charged to the reactor at one catalyst concentration. Raising the catalyst concentration reduces tetrahydrofuran formation. Optimum results are in the range of 1.1 to 1.75 moles butane diol per mole terephthalic acid. However, less advantageous results can be attained using up to 4 moles butane diol per mole terephthalic acid.

While it is preferred to prepare substantially homopolymeric polybutylene terephthalate by reacting substantially only 1,4-butane diol and terephthalic acid (except for compounds having a functionality of 3 to 6), it is within the scope of this invention to employ mixtures of butane diol with the other polyhydric alcohols such as dihydric alcohols or polyhydric alcohols having a functionality of 3 to 6 or other di- or higher functional polycarboxylic acids. Part of the free carboxylic acid can be replaced with the lower alkyl esters of dicarboxylic acids such as dimethyl terephthalate. These modifications, of course, result in some economic sacrifice compared to the preferred process.

Other suitable difunctional reactants include ethylene glycol, trimethylene glycol, dodecamethylene glycol, neopentyl glycol, 2,6-naphthalene dicarboxylic acid, adipic acid, isophthalic acid, etc. Relatively low concentrations of higher functional compounds can be used to increase the molecular weight of the polymer, such as glycerol, 1,1,-trimethylol propane, 1,1,1-trimethylol ethane, pentaerythritol, sorbitol, trimellitic anhydride, dimethylol propionic acid, pyromellitic anhydride, etc.

In somewhat greater detail this invention comprises reacting a polyhydric alcohol and a polycarboxylic acid compound in a concentration of 1.1 to 4 hydroxyl equivalents per carboxyl equivalent under polyesterification conditions at about 180° to 250° C. in the presence of a catalytic concentration of a tetravalent tin compound having one organo to tin linkage wherein 1,4-butane diol provides from 75 to 100 equivalent percent of the hydroxyl groups of the polyhydric alcohol component, a terephthalic acid compound (terephthalic acid or dimethyl terephthalate) provides from 75 to 100 equivalent percent of the carboxyl groups of the polycarboxylic acid compound, and at least 50 equivalent percent of the carboxyl equivalents are provided by terephthalic acid. The polyesterification reaction should be carried out at about 180° to 250° C., preferably 190° to 235° C. Other things being equal, the lower the reaction temperature, the longer it takes to obtain full esterification while the higher the reaction temperature, the more butane diol is converted to tetrahydrofuran. The maximum temperature obtainable under polyesterification conditions is also dependent upon the volume of the reactor and whether or not the reactants are preheated prior to bringing together catalyst, polyhydric alcohol and polycarboxylic acid compound. If a relatively large volume of reactants are heated from ambient conditions to 180° to 250° C., it is relatively difficult to reach the optimum reaction temperature of approximately 220° C. For example, in a 200 gallon reactor, the reaction mass clears about the time the reactants in the reactor reach about 220° C. Since the organotin catalyst of this invention can be heated with 1,4-butane diol without the formation of tetrahydrofuran, it is advantageous to preheat polyhydric alcohol and catalyst and deliver the preheated polyhydric alcohol composition to the reactor. Preheated terephthalic acid or butane diol suspension of terephthalic acid can also be added to the reactor, thereby enabling the continuous reaction of the components at the optimum temperature.

In contrast to the process described by the aforesaid G.E. specification, this reaction can be carried out under vacuum, pressure, or under ambient conditions and it is unnecessary to entrain the water of esterification with butane diol being removed from the reactor. In general, it is preferred to carry out this reaction in a continuous sealed reactor where the water and tetrahydrofuran are removed from the reaction mass (e.g. isolated in a condenser system) and any volatilized glycol is returned directly to the reactor. In this way the only butane diol lost is that which has been converted to tetrahydrofuran.

Since tetrahydrofuran's boiling point is substantially different from that of butane diol and the water of esterification, the tetrahydrofuran can be easily recovered in relatively pure form for resale. This is in contrast to the ester interchange route where both methanol and tetrahydrofuran have about the same boiling point (65° C.).

After substantially all of the water of esterification has been removed, the polyester can be condensed to high molecular weight using conventional means with or without the addition of additional catalyst. Generally speaking, the organotin catalysts of this invention are also effective in the polycondensation portion of the reaction.

The following examples are merely illustrative and should not be construed as limiting the scope of the invention.

EXAMPLES I to XVI

These examples compare the first stage esterifications of terephthalic acid and 1,4-butane diol under various conditions using the catalysts (a) butyl stannoic anhydride, referred to as BSA in Table I, of this invention and (b) tetrabutyl titanate, referred to as TBT, (c) butyl tin oxide (BTO) and octyltin oxide (OTO). For examples I to IV, IX to XII, XVII and XVIII, 66.4 grams terephthalic acid (0.4 moles) and appropriate amounts of 1,4-butane diol and catalyst were added to a 150 ml glass resin flask. For examples V to VIII, and XIII to XVI, 33.2 grams terephthalic acid (0.2 moles) and appropriate amounts of 1,4-butane diol and catalyst were added to the 150 ml glass resin flask. In all cases the reactor at 1 atmosphere absolute pressure was plunged into a hot oil bath heated to about 260° C. The desired operating temperature of 220° C., as measured by an internal thermocouple, was not reached until 35 minutes in some cases after the reaction was immersed in the oil bath. The oil bath temperature was adjusted to maintain the proper internal temperature. The first stage esterification was considered to be complete when the reaction mixture became clear. The distillate was collected in an ice water trap and a dry ice trap in series. The distillate was analyzed for tetrahydrofuran by gas chromatography. The concentration of reactants and amount tetrahydrofuran is set forth in Table I below:

Table I

| Example No | Catalyst | Wt% Catalyst Based on Theoretical Weight of Homopolyester Having No End Groups | Mole Ratio Butanediol to Terephthalic Acid | Moles Tetrahydrofuran formed per mole Terephthalic acid Charged to Reactor | First Stage Esterification Time in Minutes |
|---|---|---|---|---|---|
| I | BSA | 0.10 | 1.5/1 | .10 | 84 |
| II | TBT | 0.10 | 1.5/1 | .25 | 270* |
| III | BSA | 0.10 | 2/1 | .13 | 63 |
| IV | TBT | 0.10 | 2/1 | .26 | 60 |
| V | BSA | 0.10 | 3/1 | .20 | 32 |
| VI | TBT | 0.10 | 3/1 | .24 | 31 |
| VII | BSA | 0.10 | 4/1 | .22 | 24 |
| VIII | TBT | 0.10 | 4/1 | .30 | 29 |
| IX | BSA | 0.25 | 1.5/1 | .06 | 61 |
| X | TBT | 0.25 | 1.5/1 | .23 | 172* |
| XI | BSA | 0.25 | 2/1 | .10 | 40 |
| XII | TBT | 0.25 | 2/1 | .20 | 48 |
| XIII | BSA | 0.25 | 3/1 | .10 | 21 |
| XIV | TBT | 0.25 | 3/1 | .15 | 29 |
| XV | BSA | 0.25 | 4/1 | .10 | 19 |
| XVI | TBT | 0.25 | 4/1 | .13 | 23 |
| XVII | BTO | 0.25 | 2/1 | .37 | 143 |
| XVIII | OTO | 0.25 | 2/1 | .37 | 83 |

*First stage esterification did not clear.

The above data illustrates that at butane diol to terephthalic acid ratios of (a) 1.5/1, the organotin catalysts of this invention produce substantially less tetrahydrofuran in a much shorter first stage esterification period, (b) 2/1, the organotin catalysts of this invention produce about one-half the tetrahydrofuran produced by the tetrabutyl titanate in approximately the same esterification period, (c) at 3/1 and 4/1, the organotin catalysts of this invention produce less tetrahydrofuran than the tetrabutyl titanate, and (d) 2/1, butyl tin oxide, and octyl tin oxide ae markedly poorer than the organotin catalysts of this invention and tetrabutyl titanate.

EXAMPLES XIX to XXXIV

These examples illustrate the effect of pressure and temperature on butyl stannoic anhydride catalyzed esterification of butane diol and terephthalic acid. The technique described for Examples I to XVIII was repeated for Examples XIX to XXVI with the reactor plunged into the hot oil bath heated about 20° C. above the desired operating temperature. After the desired operating temperature was reached, the oil bath temperature was adjusted to maintain the proper internal temperature.

Examples XXVII to XXXIV were carried out in a stainless steel 2CV Helicone reactor which was charged with 99.6 grams terephthalic acid (0.6 mole), butane diol and butyl stannoic anhydride after the reactor was heated to the desired operating temperature. After about 5 minutes in the reactor, the reactants reached the desired operating temperature.

Table II

| Example No. | Temperature ° C. | Wt% Catalyst Based on Theoretical Weight of Polyester | Mole Ratio Butanediol to Terephthalic Acid | Absolute Pressure in Atmosphere | Moles Tetrahydrofuran Per Mole Terephthalic Charged to Reactor | First Stage Esterification In Minutes |
|---|---|---|---|---|---|---|
| XIX | 190 | .10 | 2/1 | 0.3 | .07 | 119 |

Table II-continued

| Example No. | Temperature °C. | Wt% Catalyst Based on Theoretical Weight of Polyester | Mole Ratio Butanediol to Terephthalic Acid | Absolute Pressure in Atmosphere | Moles Tetrahydrofuran Per Mole Terephthalic Charged to Reactor | First Stage Esterification In Minutes |
|---|---|---|---|---|---|---|
| XX | 190 | .25 | 2/1 | 0.3 | .05 | 149 |
| XXI | 190 | .10 | 2/1 | 1.0 | .10 | 189 |
| XXII | 190 | .25 | 2/1 | 1.0 | .11 | 199 |
| XXIII | 205 | .10 | 1.5/1 | 1.0 | .10 | 149 |
| XXIV | 205 | .25 | 1.5/1 | 1.0 | .10 | 153 |
| XXV | 205 | .10 | 2/1 | 1.0 | .11 | 100 |
| XXVI | 205 | .25 | 2/1 | 1.0 | .11 | 77 |
| XXVII | 205 | .10 | 1.5/1 | 3.0 | .12 | 155 |
| XXVIII | 205 | .25 | 1.5/1 | 3.0 | .06 | 60 |
| XXIX | 205 | .10 | 2/1 | 3.0 | .12 | 54 |
| XXX | 205 | .25 | 2/1 | 3.0 | .09 | 39 |
| XXXI | 220 | .10 | 1.5/1 | 3.0 | .12 | 56 |
| XXXII | 220 | .25 | 1.5/1 | 3.0 | .07 | 35 |
| XXXIII | 220 | .10 | 2/1 | 3.0 | .16 | 31 |
| XXXIV | 220 | .25 | 2/1 | 3.0 | .10 | 24 |

EXAMPLE XXXV

This example illustrates the production of polybutylene terephthalate using a 1.25 to 1 mole ratio of 1,4-butane diol to terephthalic acid. One hundred sixty-six grams terephthalic acid (1 mole), 112.5 grams butane diol (1.25 moles) and 0.55 gram butyl stannoic anhydride in a one liter resin kettle equipped with a knock back condenser was immersed in a hot oil bath heated to 260° C. After about 40 to 50 minutes, the reactants reached 220° C., as measured by an internal thermocouple, and the hot oil bath temperature was adjusted to maintain the internal temperature at 220° C. Seventy minutes after immersion in the oil bath, the first stage esterification was completed, the knock back condenser was removed and the polycondensation was carried out at one-half mm. at 240° C. for 2 hours. The molten syrup was removed from the reactor, cooled and ground to yield a polymer having a .88 I.V. (inherent viscosity). The condenser system has 0.08 to 0.09 moles tetrahydrofuran.

EXAMPLES XXXVI to XXXIX

These examples illustrate the production of polybutylene terephthalate using butyl stannoic anhydride and butyl stannoic acid as contrasted to dibenzyl tin oxide and stannous oxide. Example XXXV was repeated using a 1.5 to 1 mole ratio of 1,4butane diol to terephthalic acid and 0.25% by weight catalyst based on theoretical molecular weight of the polymer. In these runs it took about 40 to 50 minutes to get the reactor temperature to 220° C. The results are set forth below in Table III:

Table III

| Example No. | Catalyst | Esterification Time in Minutes | Moles Tetrahydrofuran Formed |
|---|---|---|---|
| XXXVI | Butyl Stannoic Anhydride | 55 | .12 |
| XXXVII | Butyl Stannoic Acid | 56 | .10 |
| XXXVIII | Dibenzyl Tin Oxide | 120* | .38 |
| XXXIX | Stannous Oxide | 120* | .34 |

*Did not clear

The polycondensed polymers of Examples XXXIV and XXXV had I.V.'s of 1.08 and 1.09 respectively.

The above results illustrate that tin compounds having one organo to each tin linkage are advantageous in producing polybutylene terephthalate from 1,4-butane diol and terephthalic acid.

EXAMPLES XL to XLII

These examples illustrate that dihydroxy butyl tin monochloride of this invention is markedly superior to dibutyltin maleate and dibutyltin dilaurate. The process employed in Example XI was repeated using a 2/1 mole ratio of 1,4-butane diol to terephthalic acid, 220° C reaction temperature and 0.25 weight percent catalyst based on theoretical molecular weight of the polyester. The results are set forth below in Table IV:

Table IV

| Example No. | Catalyst | Esterification Time in Minutes | Moles Tetrahydrofuran Formed Per Mole Terephthalic Charged to Reactor |
|---|---|---|---|
| XL | Dihydroxy butyl tin monochloride | 60 | .09 |
| XLI | Dibutyl tin dilaurate | 240 | .56 |
| XLII | Dibutyl tin maleate | 135* | .40 |

*Did not clear

We claim:

1. The process of carrying out a first stage polyesterification which comprises reacting a polyhydric alcohol and a polycarboxylic acid compound in a concentration of 1.1 to 4 hydroxyl equivalents per carboxyl equivalent under polyesterification conditions at about 180° to 250° C. in the presence of a catalytic concentration of a tetravalent tin compound having one organo to tin linkage, per tin atom wherein 1,4-butane diol provides from 75 to 100 equivalent percent of the hydroxyl groups of the polyhydric alcohol compound, a terephthalic acid compound provides from 75 to 100 equivalent percent of the carboxyl groups of the polycarboxylic acid compound and at least 50 percent of the carboxyl equivalents are provided by terephthalic acid.

2. The process of claim 1, wherein said tin catalyst comprises a hydrocarbyl stannoic anhydride.

3. The process of claim 2 wherein said stannoic anhydride comprises an alkyl stannoic anhydride.

4. The process of claim 1, wherein said tin catalyst comprises a hydrocarbyl stannoic acid.

5. The process of claim 4 wherein said hydrocarbyl group comprises an alkyl group.

6. The process of claim 1 wherein said tin catalyst comprises a hydrocarbyl tin halide.

7. The process of claim 6 wherein said hydroxycarbyl tin halide comprises a hydrocarbyl tin dihydroxy monohalide.

8. The process of claim 7 wherein said hydrocarbyl tin dihydroxy monohalide comprises an alkyl tin dihydroxy mono chloride.

9. The process of claim 1, wherein substantially all of the polyhydric alcohol is provided by 1,4-butane diol and substantially all of the polycarboxylic acid compound is provided by terephthalic acid.

10. The process of carrying out a first stage polyesterification which comprises reacting 1,4-butane diol and terephthalic acid in a mole ratio of 1.1 to 2.0 moles of butane diol per mole of terephthalic acid at about 180° to 250° C. in the presence of a tetravalent tin compound having one organo to tin linkage per tin atom.

11. The process of claim 10 wherein said butane diol is present in a concentration of 1.1 to 1.75 mole per mole of terephthalic acid.

12. The process of claim 10 wherein said esterification is carried out at from 190° to 235° C.

13. The process of claim 10, wherein said tin catalyst comprises a hydrocarbyl stannoic anhydride.

14. The process of claim 10 wherein said tin catalyst comprises a hydrocarbyl tin halide.

15. The process of claim 14 wherein said hydrocarbyl tin halide comprises a hydrocarbyl tin dihydroxy monohalide.

16. The process of claim 15 wherein said hydrocarbyl tin dihydroxy monohalide comprises an alkyl tin dihydroxy monochloride.

17. The process of claim 13 wherein said tin catalyst comprises an alkyl stannoic acid.

18. The process of claim 10 wherein said reaction is carried out in a continuous sealed reactor and any volatalized butane diol is returned directly to the reactor.

19. The process of claim 10 wherein said tin catalyst comprises a hydrocarbyl stannoic acid.

20. The process of claim 19 wherein said hydrocarbyl group comprises an alkyl group.

* * * * *